Oct. 16, 1923.

R. HILL 1,470,836

LEAD MEASURING MACHINE FOR GAUGES

Filed Sept. 1, 1920    3 Sheets-Sheet 1

Oct. 16, 1923.　　　　　　　　　　　　　　　　　1,470,836
R. HILL.
LEAD MEASURING MACHINE FOR GAUGES
Filed Sept. 1, 1920　　3 Sheets-Sheet 3

Inventor
Reuben Hill
By S. Jay Teller
Attorney

Patented Oct. 16, 1923.

1,470,836

UNITED STATES PATENT OFFICE.

REUBEN HILL, OF HARTFORD, CONNECTICUT, ASSIGNOR TO PRATT & WHITNEY COMPANY, OF NEW YORK, N. Y., A CORPORATION OF NEW JERSEY.

LEAD-MEASURING MACHINE FOR GAUGES.

Application filed September 1, 1920. Serial No. 407,396.

*To all whom it may concern:*

Be it known that I, REUBEN HILL, a citizen of the United States of America, residing at Hartford, in the county of Hartford and State of Connecticut, have invented certain new and useful Improvements in Lead-Measuring Machines for Gauges, of which the following is a specification.

This invention relates to linear measuring machines and especially to a linear measuring machine for determining the pitch or lead of screw threads. More especially, the invention is designed for determining the pitch or lead of tapered screw threads as, for instance, thread gauges for the Briggs taper or other standard pipe threads.

One of the objects of the invention is to provide an improved machine by means of which the distance between adjacent threads of a tapered thread gauge may be determined with a high degree of precision. One feature of the invention that is advantageous is that the measurement is always taken with the contact member pressed against the threads of the gauge being tested with a uniform pressure at the different points along the length of the gauge.

Another feature that enables me to obtain a high degree of precision is that the contact member engaging the gauge being tested is mounted on a carriage resting on antifriction bearings and the carriage is pressed uniformly against the measuring anvil of a measuring head. Another feature of advantage of my improvement is that the construction permits me to use a standard linear measuring head having a high degree of precision.

With these and other objects in view my invention consists in the features of construction and operation set forth in the following specification and illustrated in the accompanying drawings.

In the accompanying drawings annexed hereto and forming a part of this specification I have shown my invention embodied in a machine for testing the lead of tapered screw thread gauges but it will be understood that the invention can be otherwise embodied and that the drawings are not to be construed as defining or limiting the scope of the invention, the claims appended at the end of this specification being relied upon for that purpose.

In the drawings:

Fig. 5 is a fragmentary view showing a plan view of the indicator used in connection with the measuring machine.

Fig. 6 is a view showing the connection between the measuring head and carriage.

Fig. 7 is a side view of the parts shown in Fig. 6.

Briefly, my invention in its broadest aspect comprises the following principal parts: first, a base; second, a measuring head adjustably mounted thereon; third, a carriage mounted to slide with a minimum of friction in any direction on the base in a horizontal plane; fourth, centers on which a gauge may be mounted with its axis parallel to the line of movement of the measuring head; and fifth, an indicator mounted on the carriage adapted to engage the threads being examined.

This application contains subject matter also shown in my application for measuring machines for gauges, Serial No. 407,398, filed on even date herewith.

Figure 3:
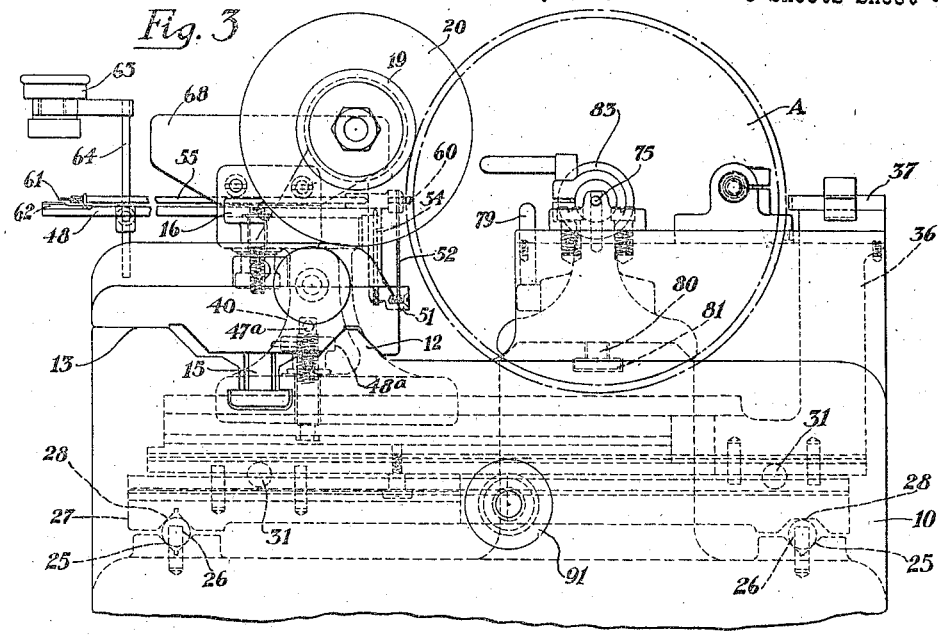
Fig. 3 is an end elevation.

Referring more in detail to the figures of the drawings, the machine or device is shown arranged for determining the lead or pitch of the screw threads on a gauge A. At 10 is shown a suitable base provided on one side with suitable guideways preferably formed as shown in Fig. 3 as an inverted V 12 and a plane surface 13. On these ways 12 and 13 a measuring head 14 is adapted to slide longitudinally and be clamped in adjusted position along the base 10 by means of screw 15 and knurled nut 16. This measuring head 14 is in every way similar to that used in standard linear measuring machines and a detailed description of it is therefore thought to be unnecessary. Suffice it to say that a contact anvil 17 mounted on the forward end of a measuring plunger 18 is movable in and out of the head 14 by rotation of the knurled head 19 on which is mounted a graduated indicating dial 20. By means of a reading taken on the dial 20 and also on a scale shown at 21 the position of the forward end of the anvil 17 may be determined with a high degree of precision.

In suitable guideways 25, 25 formed in the base 10 parallel to the guideways 12 and 13 is mounted a plurality of balls 26 on which rests a saddle 27 having guideways 28 adapted to correspond with guideways 25. Similarly, in guideways 30 formed in the upper surface of saddle 27 are balls 31 on which rests a carriage 35 provided with guideways 36 extending in a direction at right angles to guideways 28 on the saddle 27.

It will thus be seen that by means of these two sets of ball bearings extending in straight lines at right angles to each other the carriage 35 may slide in any direction in a horizontal plane with a minimum of friction. The carriage 35 thus forms a slidable base or mounting on which is fitted an indicator adapted to engage the threaded surface of a gauge at the time measurements are being taken.

On the carriage 35 is adjustably mounted a slidable support 40 preferably guided in its movements forward and back on the carriage 35 by suitable guideways in the form of a V 41 and a plane surface 42 on the carriage 35 and engaged by correspondingly formed surfaces on the lower surface of the support 40.

To conveniently move the support 40 backward and forward on the carriage 35, I provide a knurl headed member 45 to which is attached a small pinion 46 preferably formed integrally on the same member as the knurled head 45. This member 45 with pinion 46 is rotatably secured in the carriage 35 as shown. On the lower surface of the support 40 is formed a rack 47 meshing with the pinion 46 so that by rotating the knurled member 45 the support 40 may be moved backward or forward on the carriage 35. The support 40 may be clamped in adjusted position by means of a screw 47ª and a knurled nut 48ª.

Figure 4:
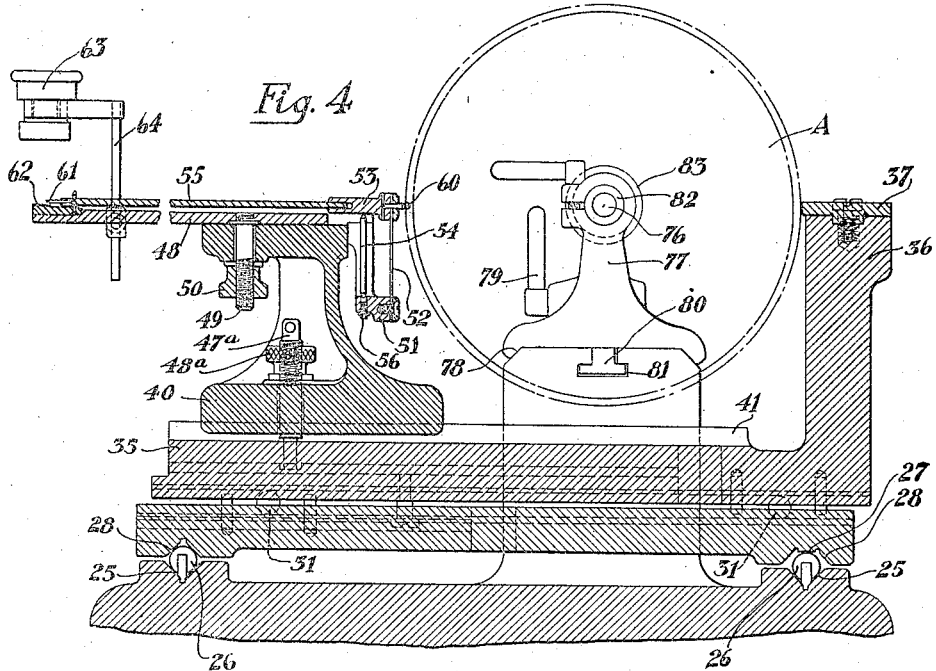
Fig. 4 is a section taken on line 4—4 of Fig. 2.

On the support 40 is fixedly mounted an indicator body 48 which is preferably fastened to the upper surface of the support 40 by any suitable clamping means such as a screw 49 and knurled nut 50 as shown. The indicator body 48 and its cooperating parts are shown more clearly in Figs. 4 and 5 and therefore will be described more particularly in connection with these figures. The forward end of the indicator body 48 is depressed as shown at 51 and has attached thereto a thin sheet of flexible metal 52 such as a thin sheet of spring steel. At its upper edge the flexible strip 52 is fastened to a head portion 53 for the indicator arm. Directly forward of the flexible strip 52 on the indicator body 48 is a pivot 54 supported by means of a slight depression in a screw 56 inserted in the part 51 of the indicator body 48. This pivot 54 aids in supporting the member 53 and also the indicator pointer 55 extending forward therefrom in a horizontal plane. By adjustment of the screw 56 the indicator arm 55 may be raised or lowered in relation to the indicator body 48. Extending rearward from the center of the part 53 is a contact pin 60. Preferably this pin 60 is inserted centrally in the part 53 in such a manner that it may be readily removed as it is essential that a number of different sizes of these contact pins be provided to fit different types or sizes of threads.

The indicator pointer 55 extends forward just above and parallel to the indicator body 48 and at is forward end is provided with a pointer 61 which passes over a suitable zero line or other indicia 62 formed on the forward end of the body member 48. In order to more accurately read the position of the pointer 61 relative to the zero line 62, a magnifying glass is provided as shown at 63 suitably supported adjacent the end of pointer 55 by an adjustable bracket 64.

Extending along one side of the support 40 is a plate 68, the outside surface 69, of which is accurately surfaced to contact with the anvil 17 of the measuring head 14. A spring 70 may also be provided adjustably secured to anvil 17 as shown clearly in Figs. 6 and 7 to hold the plate 68 in contact with the forward end of the anvil 17 but at the same time permitting the plate 68 to slide horizontally past the anvil 17 to accommodate the position of the indicator 48 to different sizes of gauges. This spring clamping means as shown, comprises a disk 71 clamped to the anvil 17 and provided with the spring 70 embracing the opposite side of the plate 68 and pressing the plate 68 and therefore the support 40 and carriage toward the left and firmly against the anvil 17.

To mount the gauge being tested in position so that its axis will lie parallel to the direction of movement of the measuring anvil 17 I provide a center 75 mounted permanently on the base 10.

A movable center in alignment with center 75 is provided, preferably mounted on a movable tailstock 77. Tailstock 77 is adapted to slide on suitable ways 78 provided on the base 10 parallel to the ways 25 and it may be clamped in any position along the ways 78 by means of lever 79 and clamping member 80 extending into the T-slot 81 in the base. Center 76 may be adjusted relative to the tailstock 77 by means of the sleeve 82 and knurled cap 83 in the usual manner.

During the operation of this measuring machine it is essential that the contact member 60 should engage the threads being tested at a substantially uniform pressure. This is accomplished first by careful adjustment of the support 40 on the carriage 35 so that the proper pressure of the leaf spring 52 acts to force the contact member 60 toward the gauge. The support is then clamped to the carriage 35 by means of the clamping screw 47$^a$ and nut 48$^a$. Before this adjustment of the support 40 takes place an angle member 85 mounted on one side of the carriage 35 is placed in contact with the contact button 86. The contacting surface of the angle member 85 is at an angle corresponding exactly with the taper of the gauge being tested so that with the support 40 clamped in position on the carriage movement of the carriage left and right will permit the carriage to slide along the taper of the gauge.

I also preferably provide a leaf spring 87 fastened to the base 10 and engaging the forward surface of the angle member 85 so that the angle member 85 is resiliently pressed against the contact button 86.

Figure 1:
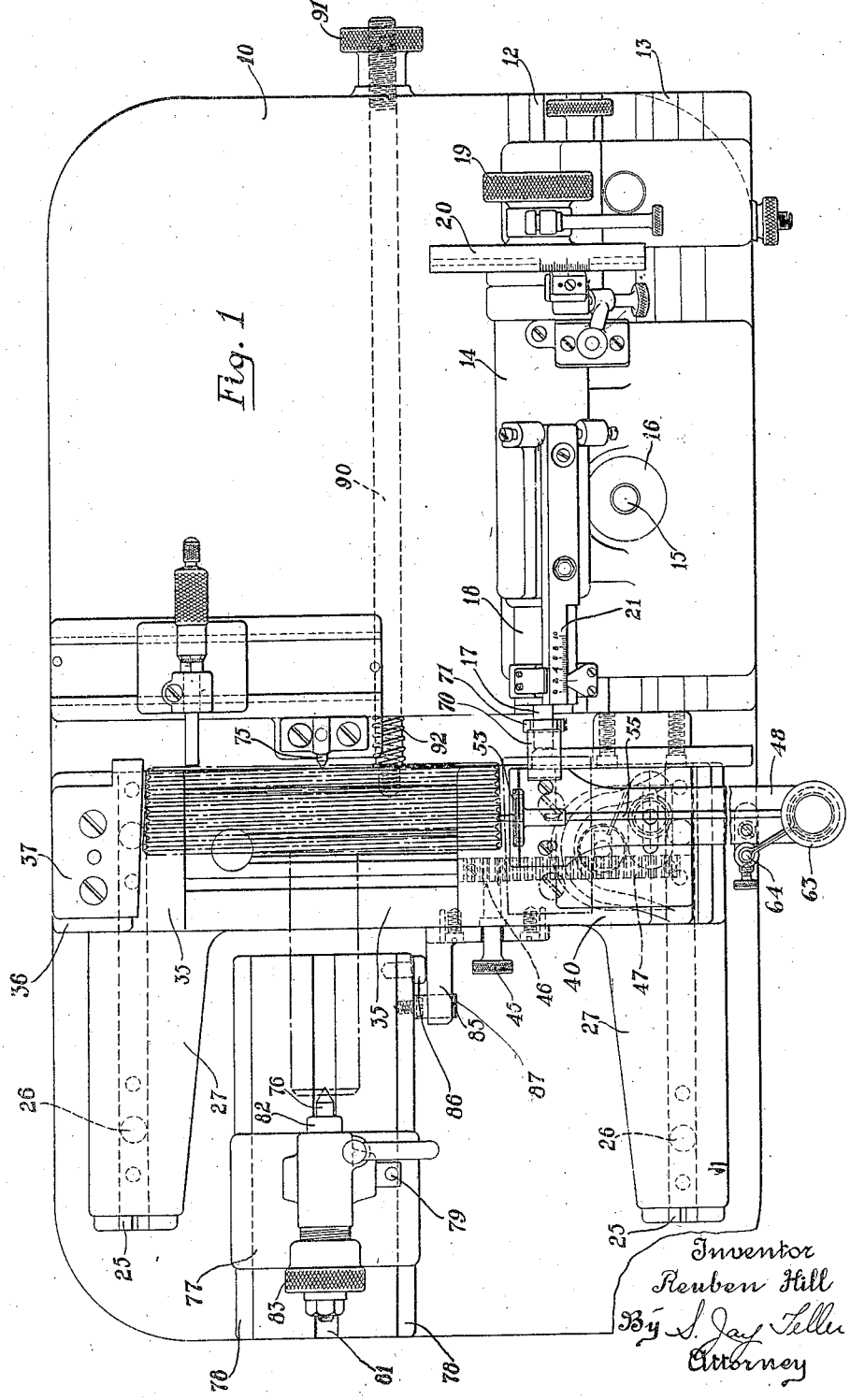
Figure 1 is a plan view of the complete machine.
Figure 2:
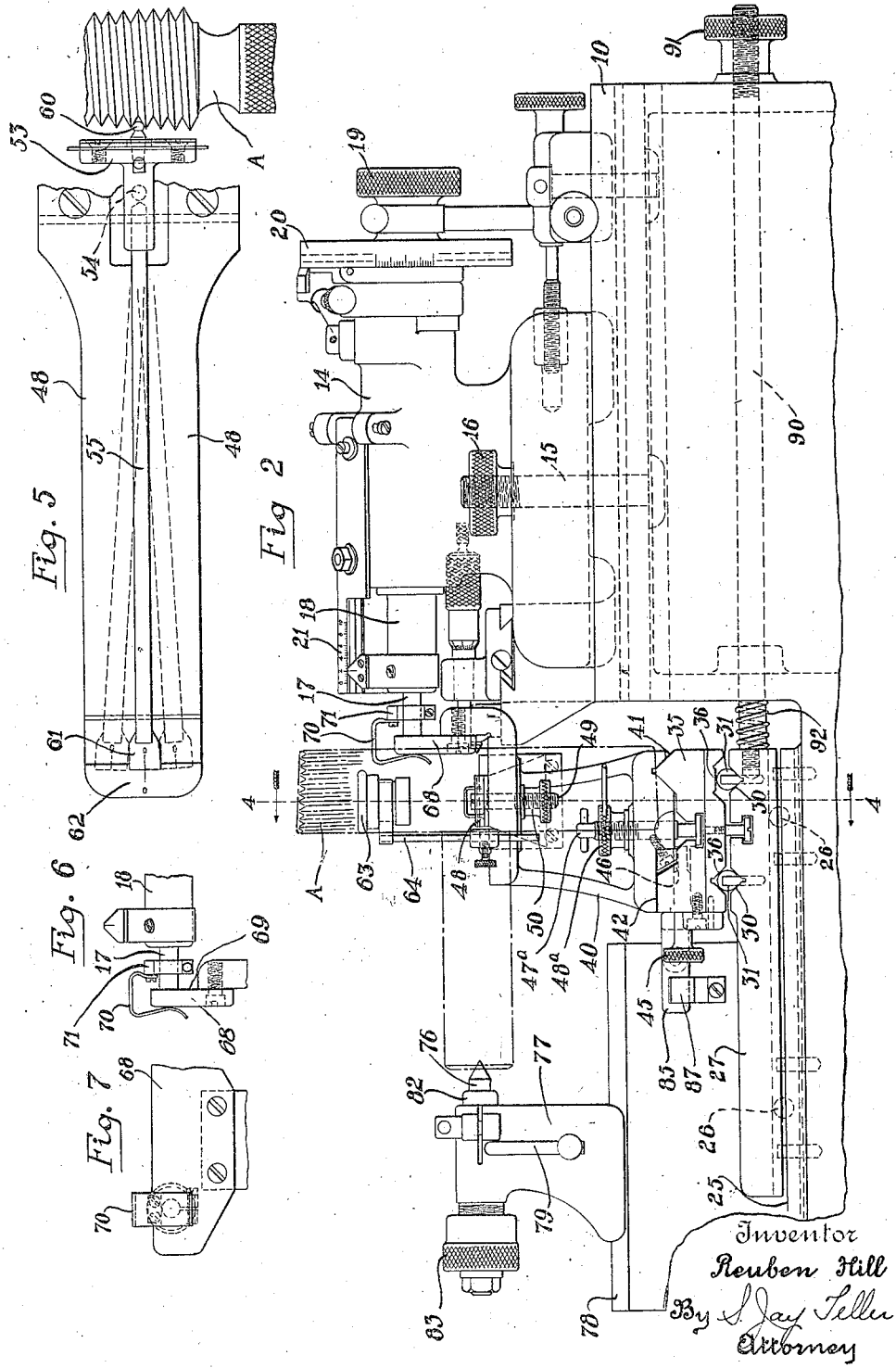
Fig. 2 is a front elevation of the same.

In lieu of the clamping device 71 to hold the carriage 35 in position so that the plate 68 on the support 40 is in contact with the anvil 17 I may provide a rod 90 extending along the base 10 and fastened at one end to one side of the saddle 27. The opposite end of the rod 90 is engaged by a knurled nut 91. Between the saddle 27 and a part of the base 10 is a light spring 92. This spring 92 tends to hold the carriage 27 toward the left as seen in Fig. 2, and, as the knurled nut 91 is adjusted, permits movement of the carriage in either direction. By means of the knurled nut 91 the saddle 27 and therefore the support 40 and the indicator 61 may be positioned properly in measuring position. As soon as this takes place the anvil 17 may be brought up against the plate 68 and a reading taken. Repeated readings of the position of the anvil 17 when the contact member 60 is in engagement with the different threads on the gauge serves to indicate the lead.

To measure the lead of any tapered screw by means of the mechanism above described it is only necessary to mount the gauge to be tested on centers 75 and 76 and by means of knurled head 45 advance the support 40 carrying the indicator body 48 into contact with one of the convolutions of the screw thread. As soon as the contact member 60 enters the threads of the gauge it deflects the indicator arm 55 so that the pointer 61 is not in alignment with the zero line 62 on the indicator body 48. The knurled head 19 is then rotated, moving the measuring head anvil 17 in a direction to allow the indicator body to move so that the pointer 61 will be in alignment with the mark 62. Movement of the anvil 17 forces the support 40 and the carriage 35 in either direction for the reason that it is resiliently held to the forward end of the anvil 17 by the spring clamp 70. As soon as the pointer 61 is in alignment with the mark 62 a reading of the dial 20 and scale 21 is taken. The contact member 60 is then withdrawn from the convolutions of the gauge preferably by flexure of the strip 52 and with the anvil 17 adjusted slightly the contact member 60 is again allowed to enter another convolution. The pointer 61 is again centered over the mark 62 by adjustment of the knurled head 19 and another reading of this disk and scale 21 taken. Repeated readings may similarly be taken throughout the length of the gauge, a comparison of the readings indicating the lead of the threads on the gauge.

If desired, the spring clamping means 70 for the anvil 17 and plate 68 may be dispensed with and the carriage 35 may be adjusted to the left or right to center the pointer 61 over the mark 62 by means of the rod 90 and nut 91. After the carriage 35 has been adjusted accurately so that the pointer 61 is properly positioned, the anvil 17 is adjusted by means of the knurled head 19 until the forward end of the anvil 17 is in contact with the plate 68. With the anvil 17 in that position a reading of the dial 20 and scale 21 is then taken.

What I claim is:

1. A lead measuring device for tapered screw thread gauges comprising in combination, a base, a support on said base for said gauge, a carriage, an indicator on said carriage adapted to contact with the gauge being tested, means to position said carriage in accordance with differences in diameter of the parts of the gauge, and means to accurately determine movements of said carriage parallel to the axis of the gauge.

2. A lead measuring device for tapered screw thread gauges comprising in combination, a base, a support on said base for said gauge, a carriage, a resiliently mounted indicator on said carriage adapted to contact with the gauge being tested, means to position said carriage in accordance with differences in diameter of the parts of the gauge, and means to accurately determine movements of said carriage parallel to the axis of the gauge.

3. A lead measuring device for tapered screw thread gauges comprising in combination, a base, a pair of centers on said base for mounting said gauge, a carriage, an indicator on said carriage adapted to contact with the gauge being tested, means to position said carriage toward or from said centers in accordance with differences in diameter of the parts of the gauge, and means to accurately determine movements of said carriage parallel to the axis of said centers.

4. A lead measuring device for tapered screw thread gauges comprising in combination, a base, a support on said base for said gauge, a carriage, an indicator on said carriage adapted to contact with the gauge being tested, means to position said carriage in accordance with differences in diameter of the parts of the gauge, and a measuring head on said base to accurately determine movements of said carriage parallel to the axis of the gauge.

5. A lead measuring device for tapered screw thread gauges comprising in combination, a base, a pair of centers on said base for mounting said gauge, a carriage, an indicator on said carriage adapted to contact with the gauge being tested, means to position said carriage toward or from said centers in accordance with differences in diameter of the parts of the gauge, and a measuring head on said base to accurately determine movements of said carriage parallel to the axis of the centers.

6. A lead measuring device for tapered screw thread gauges comprising in combination, a base, a support on said base for said gauge, a measuring head having a measuring anvil, an indicator adapted to contact with the gauge being tested, a carriage for said indicator, means to determine the position of said indicator along the taper of the gauge, and means holding said carriage toward the measuring anvil of said measuring head.

7. A lead measuring device for tapered screw thread gauges comprising in combination, a base, a support on said base for said gauge, a measuring head having a measuring anvil, a resiliently mounted indicator adapted to contact with the gauge being tested, a carriage for said indicator, means to determine the position of said carriage along the taper of the gauge, and means holding said carriage toward the measuring anvil of said measuring head.

8. A lead measuring device for tapered screw thread gauges comprising in combination, a base, a pair of centers on said base for supporting said gauge, a measuring head, an indicator adapted to contact with the gauge being tested, a carriage for said indicator adapted to slide in a direction parallel to the axis of said centers, means to determine the position of said indicator along the taper of the gauge, and means holding said carriage toward the measuring anvil of said measuring head.

9. A lead measuring device for tapered screw thread gauges comprising in combination, a base, a support on said base for said gauge, a measuring head having a measuring anvil, an indicator adapted to contact with the gauge being tested, a carriage for said indicator adapted to slide in any direction on said base, means to determine the position of said indicator along the taper of the gauge, and means holding said carriage toward the measuring anvil of said measuring head.

10. A lead measuring device for tapered screw thread gauges comprising in combination, a base, a pair of centers on said base for said gauge, a measuring head movable in a direction parallel with the axis of said centers, an indicator adapted to contact with the gauge being tested, a carriage for said indicator slidable in any direction on said base, means to determine the position of said indicator along the taper of the gauge, and means resiliently holding said carriage toward the measuring anvil of said measuring head.

11. A lead measuring device for tapered screw thread gauges comprising in combination, a base, a support on said base for said gauge, a measuring head thereon having a measuring anvil, an indicator adapted to contact with the gauge being tested, a carriage for said indicator, means to guide said carriage in a direction parallel to the taper of the gauge, and means holding said carriage toward the measuring anvil of said measuring head.

12. A lead measuring device for tapered screw thread gauges comprising in combination, a base, a pair of centers on said base for said gauge, a measuring head thereon having a measuring anvil movable parallel to the axis of said centers, an indicator adapted to contact with the gauge being tested, a carriage for said indicator, means to guide said carriage in a direction parallel to the taper of the gauge, and means holding said carriage toward the measuring anvil of said measuring head.

13. A lead measuring device for tapered screw thread gauges comprising in combination, a base, a support on said base for said gauge, a measuring head thereon having a measuring anvil, an indicator adapted to contact with the gauge being tested, a carriage for said indicator movable in any direction, means to guide said carriage in a direction parallel to the taper of the gauge, and means holding said carriage toward the measuring anvil of said measuring head.

In testimony whereof I hereto affix my signature.

REUBEN HILL.